(12) United States Patent
Hansen

(10) Patent No.: US 10,077,950 B2
(45) Date of Patent: Sep. 18, 2018

(54) TUBING FOR HEAT EXCHANGE, AND A METHOD FOR IMPROVING HEAT EXCHANGE

(71) Applicant: Lars Hansen, Hamnvik (NO)

(72) Inventor: Lars Hansen, Hamnvik (NO)

(73) Assignee: Lars Hansen, Hamnvik (NO)

( * ) Notice: Subject to any disclaimer, the term of this patent is extended or adjusted under 35 U.S.C. 154(b) by 79 days.

(21) Appl. No.: 15/103,729

(22) PCT Filed: Dec. 18, 2014

(86) PCT No.: PCT/NO2014/050245
§ 371 (c)(1),
(2) Date: Jun. 10, 2016

(87) PCT Pub. No.: WO2015/093977
PCT Pub. Date: Jun. 25, 2015

(65) Prior Publication Data
US 2016/0320146 A1    Nov. 3, 2016

(30) Foreign Application Priority Data

Dec. 19, 2013  (NO) .................................. 20131687

(51) Int. Cl.
| | | |
|---|---|---|
| *F16L 9/18* | (2006.01) | |
| *F28F 1/00* | (2006.01) | |
| *F28D 7/02* | (2006.01) | |
| *F28D 20/00* | (2006.01) | |
| *F28F 27/00* | (2006.01) | |
| *F28D 21/00* | (2006.01) | |

(52) U.S. Cl.
CPC .............. *F28F 1/003* (2013.01); *F28D 7/024* (2013.01); *F28D 20/0034* (2013.01); *F28F 27/00* (2013.01); *F28D 2021/0035* (2013.01); *F28F 2265/12* (2013.01); *F28F 2265/16* (2013.01); *Y02E 60/142* (2013.01)

(58) Field of Classification Search
CPC .... Y10T 29/49351; F28D 7/022; F28D 7/106
USPC .............. 138/114, 148, 109; 122/32; 165/70
See application file for complete search history.

(56) References Cited

U.S. PATENT DOCUMENTS

| | | | |
|---|---|---|---|
| 3,934,618 A | 1/1976 | Henderson | |
| 4,343,350 A | 8/1982 | Campbell | |
| 4,428,106 A | 1/1984 | Campbell | |
| 4,870,734 A | 10/1989 | Sulzberger | |

(Continued)

FOREIGN PATENT DOCUMENTS

| | | |
|---|---|---|
| CN | 1378638 A | 6/2002 |
| EP | 2591851 | 5/2013 |

(Continued)

*Primary Examiner* — Patrick F Brinson
(74) *Attorney, Agent, or Firm* — Gable Gotwals

(57) ABSTRACT

This invention relates to tubing and a method for heat exchange between a first fluid which is in the tubing and a second tubing which is outside of the tubing. The tubing extends between a first end portion and a second end portion. The tubing includes an inner tube and an outer tube which is arranged on the outside of the inner tube. The inner tube being connected to the outer tube in a fluid-tight manner at the first end portion. The first end portion being surrounded by and attached to a fluid-supply pipe and there being in the second end portion, a passage between the inner tube and the outer tube.

6 Claims, 3 Drawing Sheets

(56) References Cited

U.S. PATENT DOCUMENTS

| | | | | |
|---|---|---|---|---|
| 5,102,012 A * | 4/1992 | Foster | ................... | B67D 7/0478 |
| | | | | 138/104 |
| 5,129,428 A * | 7/1992 | Winter | ..................... | B29C 63/18 |
| | | | | 138/104 |
| 5,343,937 A * | 9/1994 | Gross | ....................... | F16L 39/00 |
| | | | | 137/334 |
| 6,000,434 A * | 12/1999 | Winter | ................. | B29C 47/0023 |
| | | | | 138/121 |
| 6,029,505 A * | 2/2000 | Webb | ....................... | F16L 39/00 |
| | | | | 137/312 |
| 6,131,615 A * | 10/2000 | Hartnagel | .......... | B60H 1/00342 |
| | | | | 138/109 |
| 2005/0139173 A1* | 6/2005 | Gordon | ................... | F24D 3/082 |
| | | | | 122/32 |

FOREIGN PATENT DOCUMENTS

| | | |
|---|---|---|
| FR | 2528557 | 12/1983 |
| GB | 1145513 A | 3/1969 |
| GB | 1595190 A | 8/1981 |
| JP | H06323777 A | 11/1994 |
| JP | 2008281249 A | 11/2008 |
| JP | 2011075154 A | 4/2011 |
| NO | 326440 B1 | 12/2008 |
| SE | 8107698 L | 3/1986 |

\* cited by examiner

TUBING FOR HEAT EXCHANGE, AND A METHOD FOR IMPROVING HEAT EXCHANGE

CROSS-REFERENCE TO RELATED APPLICATIONS

This United States application is the National Phase of PCT Application No. PCT/NO2014/050245 filed 18 Dec. 2014, which claims priority to Norwegian Patent Application No. 20131687 filed 19 Dec. 2013, each of which is incorporated herein by reference.

The present invention relates to a heat-exchanger tubing. More particularly, it relates to a tubing for heat exchange between a first fluid which is in the tubing and a second fluid which is outside the tubing, the tubing being surrounded by the second fluid between a first end portion and a second end portion.

The following description is especially directed towards the heating of a fluid which is in a tank, but the invention is not limited to this.

When heating consumption water that is in a closed tank, for example, it is known to place a spiral tube submergedly in the water in the tank and carry a fluid at relatively high temperature through the spiral tube in order thereby to provide a heat exchange between the fluid in the spiral tube and the water in the tank. Such a tank is generally known, for example from the applicant's patent NO326440.

The fluid in the tubing may be an energy-carrier that forms part of a heat-pump system. The fluid may thus be a liquid under high pressure, typically in the order of 25-30 bar. The water in the tank will normally have a pressure in the order of 4-7 bar, depending on the pressure in a water-supply network. A tank for heating consumption water will normally be provided with a safety valve that opens if the pressure exceeds a predetermined level, typically 9 bar.

Over time, consumption water in the tank may erode a hole in the tubing in the tank. The tubing may be a spiral tube, for example. If said energy-carrier in the form of a liquid under pressure is released from the spiral tube and enters the water of the tank, the entering liquid will immediately change into a gaseous form, thereby creating a considerable pressure increase in the tank. The immediate and considerable pressure increase will not be drainable by said safety valve or other known safety devices. Thereby an explosion with a considerable damage potential may occur.

Even in a case in which the energy-carrier is not a liquid under high pressure, it may be unfavourable, from a health perspective, if it should mix with the consumption water in the tank.

As a consequence of the above-mentioned risk, the authorities of some countries demand, among other things, that a heating tube, for example a heating coil, that contains a gas or a liquid and that is placed submergedly in a closed tank for consumption water, a so-called water heater, that is, shall be subject to regular visual inspection and leakage-testing. Such inspection cannot possibly be carried out for a heating coil which is placed in a tank that has been closed by means of welding, without extensive and expensive interventions having to be carried out in the tank.

The invention has for its object to remedy or reduce at least one of the drawbacks of the prior art or at least provide a useful alternative to the prior art.

The object is achieved through features which are specified in the description below and in the claims that follow.

According to a first aspect of the invention, a tubing for heat exchange between a first fluid which is in the tubing and a second fluid which is outside the tubing is provided, the tubing extending between a first end portion and a second end portion. The tubing includes an inner tube and an outer tube arranged on the outside of the inner tube, the inner tube being connected to the outer tube in a fluid-tight manner at the first end portion, the first end portion being surrounded by and attached to a fluid-supply pipe, and there being, in the second end portion, a passage between the inner tube and the outer tube.

At the first end portion of the tubing, the outer tube is thus connected to the inner tube, whereas, at the second end portion of the tubing, there is one or more open portions between the inner tube and the outer tube. In one embodiment, there is not a solid connection between the inner tube and the outer tube at the first end portion of the tubing. The inner tube, the seal between the inner tube and the outer tube, and the outer tube thus form an oblong, U-shaped body, the bottom of the U being positioned at the first end portion of the tubing, and the top of the U being positioned at the second end portion of the tubing.

Provided that the fluid that is outside the tubing is not in fluid communication with the open passage in the second end portion, fluid supplied through the fluid-supply pipe will be carried into the inner tube. This has the effect of the inner tube being exposed to fluid in the inner tube, and of the outer tube being exposed to fluid on the outside of the outer tube. In addition, both tubes are exposed to, for example, air present between the outer tube and the inner tube.

To enable a good heat exchange between the first fluid and the second fluid while, at the same time, enabling any fluid penetrating through the outer tube to be drained out through the open passage of the second end portion, the external diameter of the inner tube is smaller than the internal diameter of the outer tube.

The tubing may be arranged in a tank which is provided with a first opening for receiving the first end portion of the tubing and a second opening for receiving the second end portion of the tubing. The tank may be, for example, but is not limited to, a tank for heating a liquid. The liquid may be consumption water, for example.

To be able to provide a large heat-exchange area in as little space as possible, while, at the same time, enabling any liquid present between the inner tube and the outer tube to be drained by means of gravity out through the open passage at the second end portion of the tubing, at least a portion of the tubing is arranged in a helix between the first end portion and the second end portion. In such a case, the first end portion is placed at a higher elevation than the second end portion.

In a second aspect of the present invention, a method of improving a heat exchange between a first fluid which is in an inner tube and a second fluid which is on an outside of an outer tube is provided, the outer tube being arranged on the outside of the inner tube and the external diameter of the inner tube being smaller than the internal diameter of the outer tube, the method including:

in a first end portion of the tubing, providing a fluid-tight connection between the inner tube and the outer tube;

inserting said first end portion into a portion of a fluid-supply pipe to provide fluid connection between the fluid-supply pipe and the inner tube and attaching the outer tube to the fluid-supply pipe; and in a second end portion of the tubing, maintaining a passage between the internal surface of the outer tube and the external surface of the inner tube.

In what follows, an example of a preferred embodiment is described, which is visualized in the accompanying drawings, in which:

FIG. 1b shows a section through I-I of FIG. 1a;

Figure 1A:
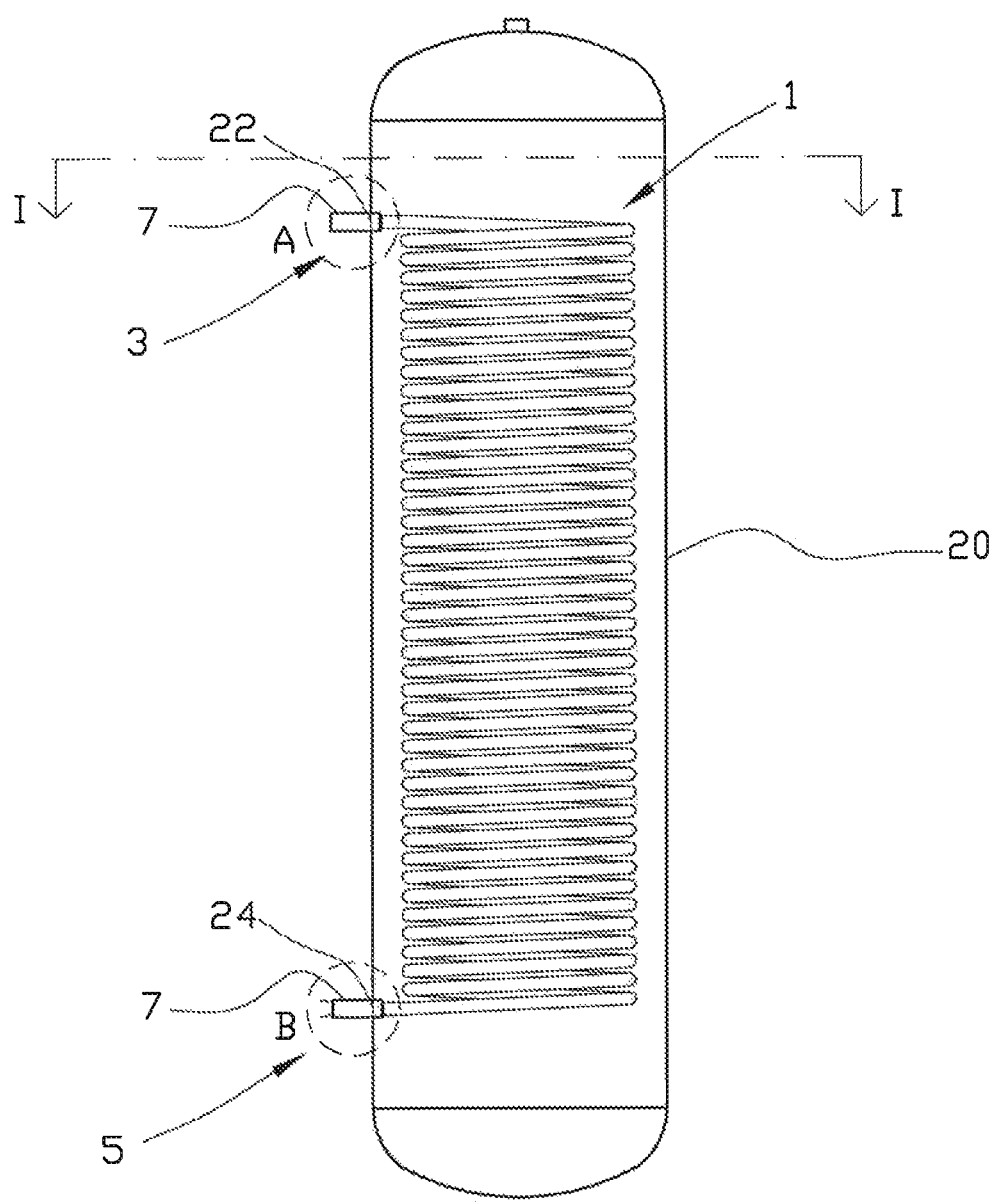
FIG. 1a shows a tank with an internal spiral tube for heating consumption water, the spiral tube having a first end portion and a second end portion projecting through openings in the wall of the tank.

Positional indications such as "over", "under", "lower", "upper", "right" and "left" refer to the positions shown in the figures.

In the individual figures, the same reference numeral indicates the same or corresponding elements.

In the figures, the reference numeral 1 indicates a tubing according to the present invention for heat exchange between a first fluid which is in the tubing 1 and a second fluid which is outside the tubing 1. The tubing 1 has a first end portion 3 and a second end portion 5.

Figure 1B:
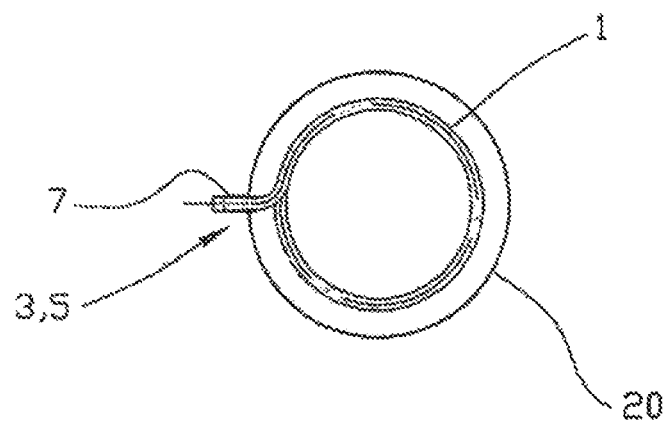

In FIG. 1a and FIG. 1b, the tubing 1 is arranged inside a closed tank 20. The tank may be, for example, a tank for heating consumption water and/or for heating buildings by means of so-called radiators or by means of a pipe system for so-called waterborne heat.

The present invention is well suited for use together with the applicant's invention according to NO326440.

The first end portion 3 of the tubing 1 projects through an upper cut-out 22 in a side portion of the tank 20, whereas the second end portion 5 of the tubing 1 projects through a lower cut-out 24 in the side portion of the tank 20. In the embodiment shown, the tubing 1 is arranged in a helix between the end portions 3, 5.

Figure 2:
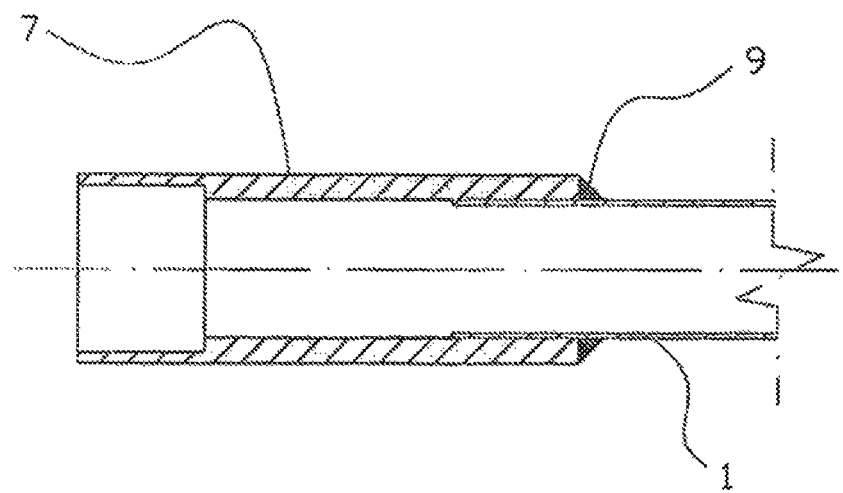
FIG. 2 shows an end portion of a spiral tube of a known kind, on a larger scale.

A person skilled in the art will know that in such a spiral tube, the tubing 1 may be relatively thin-walled, for example 0.8 mm for a tubing with an external diameter of 22 mm. To reinforce the tubing 1 through the cut-outs 22, 24 of the tank 20 and to facilitate the connection of the tubing 1 to a supply pipe (not shown) and a return pipe (not shown) at the first end portion 3 of the tubing 1 and at the second end portion 5 of the tubing 1, respectively, the tubing 1 is connected to a sleeve 7. The sleeve 7 surrounds an end portion of the tubing 1 as is shown in FIG. 2 showing a tubing 1 according to the prior art. In the embodiment shown, the sleeve 7, which in this document constitutes part of the supply pipe or return pipe, has a thickness that is several times the thickness of the tubing 1.

The internal diameter of the sleeve 7 is complementarily adapted to the external diameter of the tubing 1 so that a tight fit is provided between these when the end portion of the tubing 1 has been inserted in the sleeve 7.

FIG. 2 shows a tubing 1 which is attached to the sleeve 7 by means of a welded connection in the form of a fillet weld 9. FIG. 2 illustrates both a typical inlet portion and a typical outlet portion for a tubing for heat exchange between a first fluid which is in the tubing 1 and a second fluid which is outside the tubing 1. The tubing 1 shown in FIG. 2 is encumbered with the considerable drawbacks that are discussed above. It is also known that instead of, or in addition to, the welded connection shown, the tubing 1 and the sleeve 7 may be connected by threads.

Figure 3:
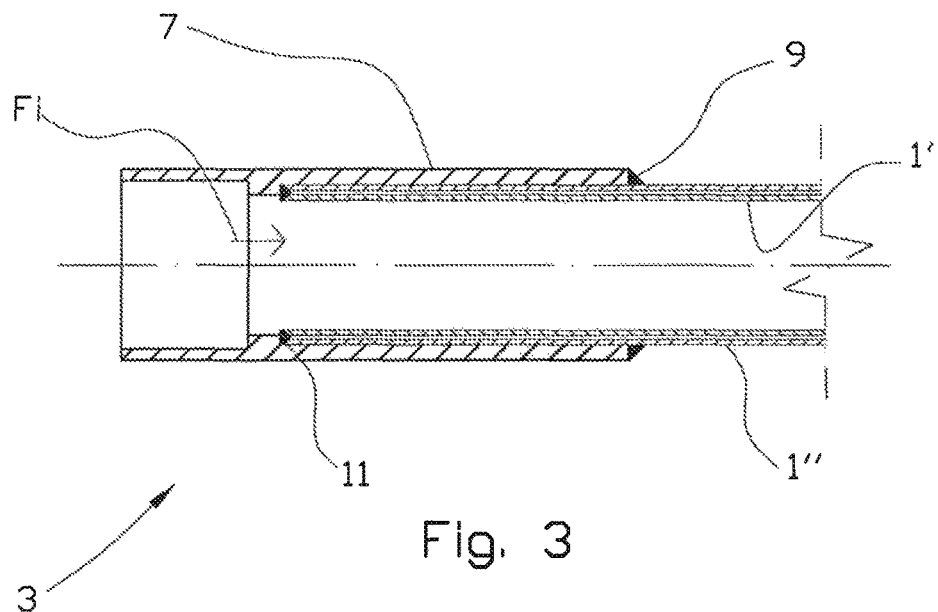
FIG. 3 shows the detail A of FIG. 1a on a larger scale, but without the wall portion of the tank.

FIG. 3 shows an inlet portion of, for example, the tank 20 that is shown in FIG. 1, but without the tank wall itself being shown. A sleeve 7 surrounds the first end portion 3 of the tubing 1. The tubing according to the present invention is substantially different from the prior-art tubing that is shown in FIG. 2.

The tubing 1 consists of an inner tube 1' and an outer tube 1", the outer tube 1" being arranged on the outside of the inner tube 1'. As shown in FIG. 3, the end face of the inner tube 1' is adapted, in terms of length, to the outer tube 1", so that in the first end portion 3, the tubes 1', 1" substantially have the same axial extent.

The end portions of the inner tube 1' and outer tube 1" are joined together by means of a sealing means 11. One of the purposes of the sealing means 11 is to prevent fluid from entering the space between the inner tube 1' and the outer tube 1". Said fluid thus flows from the sleeve 7 into the inner tube 1' as shown by the arrow Fi in FIG. 3.

In a preferred embodiment, the sealing means 11 is provided by a welded connection which is shown as a butt weld in FIG. 3.

If, in the first end portion, the inner tube 1' has an axial extent (not shown) different from that of the outer tube 1", for example by the outer tube 1" extending further into the sleeve 7 than the inner tube 1', a fillet weld, for example, could be used to provide a seal between the tubes 1', 1".

In the embodiment shown, the external diameter of the inner tube 1' is smaller than the internal diameter of the outer tube 1". This is necessary in order to, among other things, be able to drain any fluid, such as a liquid, that might enter the space defined by the tubes 1', 1" and the fluid-tight connection at the first end portion 3 of the tubing out through the open passage at the second end portion 1" of the tubing 1. The open passage will be described in more detail in what follows, in the description of FIG. 4. Such drainage could give a warning about the inner tube 1' or the outer tube 1" being damaged.

The warning may be provided by means of a sensor device of a kind known per se, which is arranged to be able to emit a signal on the detection of one or both of the fluids of the kind that is inside the inner tube 1' or the liquid in the tank 20.

Seen in relation to the prior art shown in FIG. 2, in which heat exchange between the fluid on the outside of the tubing 1 and the fluid on the inside of the tubing 1 happens through a single tubing wall, a person skilled in the art may easily draw the conclusion that the heat exchange through the double tubing 1', 1" according to the present invention might be poorer. This is, among other things, because in portions of the tubing 1, there may be a distance between the outer surface of the inner tube 1' and the inner surface of the outer tube 1".

However, comparative tests have surprisingly shown that a tank 20 of the kind that is shown in FIG. 1 and that was provided with a "single coil" according to the prior art has practically the same heat-exchange capacity as a corresponding tank 20 provided with a "double coil" according to the present invention. A possible explanation for this may be that heat supplied to the sleeve 7 from the fluid that is flowing through the sleeve 7 on into the inner tube 1' is carried to the outer tube via: the contact portion between the inner surface of the sleeve 7 and the external surface of the outer tube 1"; the weld 9; and via the sealing means 11 in those cases in which this consists of a metal or other materials with good thermal-conductivity properties. The sealing means 11 will thus form a "bridge" between the inner tube 1", which is exposed to the fluid that is carried into the tubing 1, and the outer tube 1".

Especially in those cases in which the tubing 1 is arranged in a helix between the first end portion 3 and the second end portion 5, portions of the inner tube 1' will rest against portions of the outer tube 1", thus forming "heat-conduction bridges" between the tubes 1', 1", while, at the same time, a fluid may pass in the space between the tubes 1', 1" from the inlet portion 3 and out through the outlet portion 5. For said heat-conduction bridges to have a sufficient extent, it is a prerequisite that there is relatively little difference between the external diameter of the inner tube 1' and the internal diameter of the outer tube 1". In the above-mentioned tests, the radial distance between an outer tube 1" with an external diameter of 25 mm, and an inner tube 1' positioned coaxially with an external diameter of 22 mm was 0.7 mm.

Figure 4:
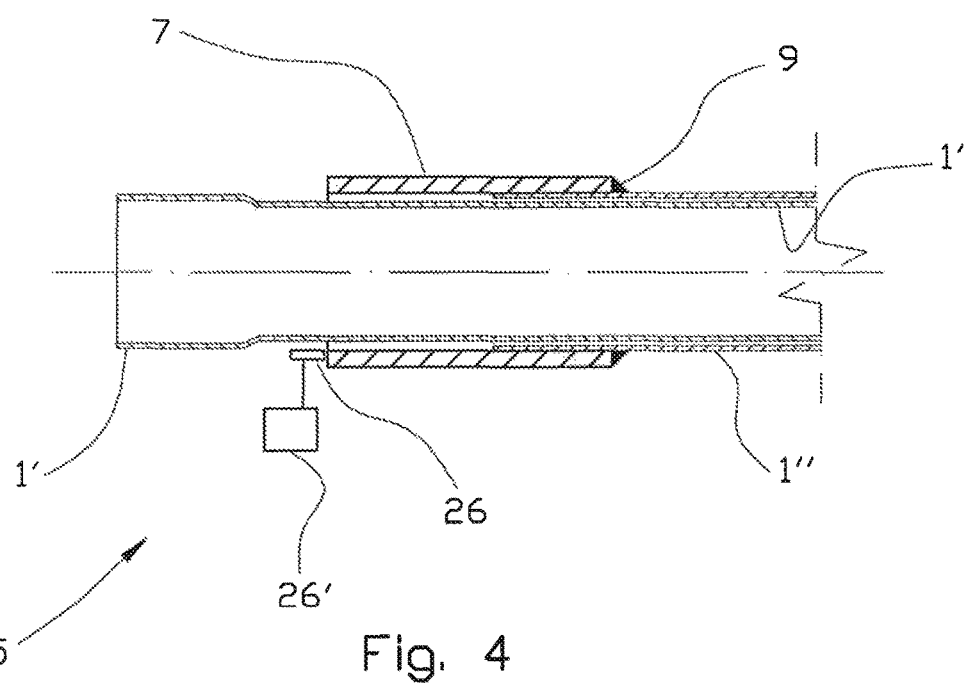
FIG. 4 shows the detail B of FIG. 1a on a larger scale, but without the wall portion of the tank.

FIG. 4 shows an outlet portion of, for example, the tank 20 that is shown in FIG. 1a, but without the tank wall itself being shown. A sleeve 7 surrounds the second end portion 5 of the tubing 1. The tubing 1 according to the present invention is substantially different from the prior-art tubing 1 that is shown in FIG. 2.

In FIG. 4, the end portion of the inner tube 1' has a larger axial extent than the end portion of the outer tube 1". Besides, the inner tube 1' extends through the sleeve 7 and thus projects from both end portions of the sleeve 7. The end portion of the inner tube 1' is formed with a larger diameter than the rest of the tube so that the inner tube 1' can surround a portion of a return pipe not shown.

In the second end portion 5 of the tubing 1, in contrast to the first end portion 3 of the tubing 1, there is no solid connection between the inner tube 1' and the outer tube 1". Thus, any fluid present between the inner tube 1' and the outer tube 1" may thus be communicated out through the passage provided in consequence of the external diameter of the inner tube 1' being smaller than the internal diameter of the outer tube 1". If a leak should arise in the inner tube 1' or in the outer tube 1", the fluid, whether a gas or a liquid being involved, will then be carried out of the tubing 1 in the space or channel which is provided between the inner tube 1' and the outer tube 1" and further out of the tank 20 via the sleeve 7. As mentioned above, a sensor device 26 may sense and give a signal to a signal transceiver 26' which may give a warning that a leakage has occurred. Such a sensor device 26 and signal transceiver 26' are shown in principle in FIG. 4.

In one embodiment, the signal from the signal transceiver 26' may be transmitted to a control device of, for example, a heat pump (not shown) or some other device providing circulation of fluid through the spiral tube 1, so that the circulation stops and the heat exchange ceases. Alternatively or additionally, a user may be warned in some other way, for example by means of an SMS.

The second end portion of the tubing 1 is attached to the sleeve 7 by means of a welded connection 9 between the outer tube 1" and the end portion of the sleeve 7.

As shown in FIG. 4, the outer tube 1" extends only a limited distance into the sleeve 7. The purpose of not extending the outer tube 1" through the whole or the major part of the sleeve is to provide a smallest possible contact surface between the sleeve 7 and the outer tube 1". Thus, heat transfer between, for example, heated water in the tank 20 shown in FIG. 1 and the outside of the tank 20 will be the least possible.

Instead of the welded connection 9 shown in FIG. 3 and FIG. 4, the connection between the outer tube 1" and the sleeve 7 may be provided by means of, for example, a threaded connection or by means of an adhesive.

By the very fact of the above-mentioned U-shape which is provided by the inner tube 1', the seal 11 between the inner tube 1' and the outer tube 1", and the outer tube 1", there will not be a flow-through of air between the end portions 3, 5 of the tubing 1. Such a flow-through would have reduced the heat transfer from the fluid in the inner tube 1' to the liquid in the tank 20 because a portion of the energy would have been spent on heating the air flowing through. A flow-through of air could occur if the first end portion 3 shown in FIG. 3 were replaced with an end portion corresponding to the second end portion 5 shown in FIG. 4.

The invention claimed is:

1. Tubing (1) arranged in a tank for heating a liquid, the tubing being in fluid communication with a compressor of a heat pump system, the tubing having a first end portion (3) and a second end portion (5), the tubing (1) extending from a first opening (22) in a wall of the tank (20) to a second operating (24) in the wall of the tank (20), at least a portion of the tubing (1) extending in a helix between the first end portion (3) and the second end portion (5), the tubing (1) configured for heat exchange between a first fluid being an energy-carrier circulating in the heat pump system and a second fluid which is in the tank (20) outside the tubing (1), a first end portion (3) of the tubing arranged at the first opening (22) in the tank (20), and the second end portion (5) arranged at the second opening (24) in the tank (20), said tubing (1) comprises:

an inner tube (1') and an outer tube (1") which is arranged on the outside of the inner tube (1'), the inner tube (1') being connected to the outer tube (1") in a fluid-tight manner at the first end portion (3);

the first end portion (3) being surrounded by and attached to a fluid-supply pipe being in fluid communication with the compressor, there being, in the second end portion (5), a passage between the inner tube (1') and the outer tube (1"); and the fluid-supply pipe is attached to the outer tube (1") by a weld (9), and the fluid-tight connection between the inner tube (1') and the outer tube (1") is provided by a weld (11), so that a heat-conducting bridge is formed between the inner tube (1') and the outer tube (1") at the first end portion (3), and the external diameter of the inner tube (1') is smaller than the internal diameter of the outer tube (1"), thereby forming a space between at least portions of the inner tube (1') and the outer tube (1") along the entire length of the tube (1) so that fluid present between the inner tube (1') and the outer tube (1") from the fluid-tight connection at the first end portion (3) of the tubing (1) can be communicated out through the passage at the second end portion (5) of the tubing.

2. The tubing according to claim 1, wherein the supply pipe includes a reinforcing sleeve (7) which is connected to the outer tube (1") by the weld (9).

3. The tubing according to claim 1, wherein the inner tube (1') is connected to a fluid-return pipe at the second end portion (5), and wherein the fluid-supply pipe and the fluid-return pipe form parts of a closed circuit.

4. A method of manufacturing a tubing (1) according to claim 1 for improving a heat exchange between a first fluid which is in an inner tube (1') and a second fluid which is on an outside of an outer tube (1"), a major part of the outer tube (1") being arranged on the outside of the inner tube (1'), said method comprises the following steps:

forming a U-shaped tubing (1) by inserting an inner tube (1') into an outer tube (1"), the external diameter of the inner tube (1') being provided with a smaller diameter than the internal diameter of the outer tube (1') so that a space is provided between at least portions of the inner tube (1') and the outer tube (1") along the entire length of the tubing (1), the tubing having a first end portion (3) and a second end portion (5) and at the first end portion (3) attaching the inner tube (1') to the outer tube (1") by a weld (11) to form a fluid tight connection and in a second end portion (5) of the tubing (1', 1"), maintaining a passage between the internal surface of the outer tube (1") and the external surface of the inner tube (1');

inserting said first end portion (3) of the U-shaped tubing (1) into a sleeve (7);

connecting the outer tube (1") to the sleeve (7) by a weld (9) connecting an end portion of the sleeve (7) to an outside surface of the outer tube (1") so that the welded connections (11, 9) and the sleeve (7) provide a heat-conducting bridge from the inner tube (1') to the outer tube (1").

5. The method according to claim 4, wherein, in the second end portion (5), the inner tube (1') is put into fluid communication with a fluid-return pipe.

6. The method according to claim 4, wherein a sensor device (26) that responds to at least one of the fluids in the inner tube (1') and on the outside of the outer tube (1") is connected to a signal transmitter.

\* \* \* \* \*